US012800376B2

(12) United States Patent
Holmegaard et al.

(10) Patent No.: US 12,800,376 B2
(45) Date of Patent: Nov. 17, 2026

(54) PREVENTING FROST DAMAGE OF FLOW METERS IN A DISTRIBUTION NETWORK

(71) Applicant: Kamstrup A/S, Skanderborg (DK)

(72) Inventors: Lotte Holmegaard, Skanderborg (DK); Sune Hoveroust Dupont, Skanderborg (DK); Mads Raunbak, Skanderborg (DK); Morten Ørris Poulsen, Skanderborg (DK); Morten Rasmussen, Skanderborg (DK)

(73) Assignee: Kamstrup A/S, Skanderborg (DK)

(*) Notice: Subject to any disclaimer, the term of this patent is extended or adjusted under 35 U.S.C. 154(b) by 530 days.

(21) Appl. No.: 18/493,218

(22) Filed: Oct. 24, 2023

(65) Prior Publication Data

US 2024/0133726 A1 Apr. 25, 2024
US 2024/0230389 A9 Jul. 11, 2024

(30) Foreign Application Priority Data

Oct. 25, 2022 (EP) .................................... 22203491

(51) Int. Cl.
*G01F 15/10* (2006.01)

(52) U.S. Cl.
CPC .................................... *G01F 15/10* (2013.01)

(58) Field of Classification Search
CPC ....................................................... G01F 15/10
(Continued)

(56) References Cited

U.S. PATENT DOCUMENTS 8,781,715 B2 * 7/2014 Breed .................... G07C 5/008
455/500
11,898,705 B2 * 2/2024 Solomon ................... F17D 5/06
(Continued)

FOREIGN PATENT DOCUMENTS

CN 215811056 U 2/2022
KR 20120056436 A * 6/2012 .............. G08B 3/10
(Continued)

OTHER PUBLICATIONS

Extended European Search Report dated Mar. 29, 2023, for European Patent Application No. 22203491.0.

*Primary Examiner* — Lina Cordero
*Assistant Examiner* — Joshua L Forristall
(74) *Attorney, Agent, or Firm* — Renner, Otto, Boisselle & Sklar, LLP

(57) ABSTRACT

The present invention provides a method for preventing frost damage to one or more flow meters installed in a fluid distribution network containing a fluid, wherein each flow meter is configured to measure a temperature, preferably an air temperature, and to wirelessly transmit the measured temperature, such as via a mobile or a fixed wireless reading system to a processing unit. The method comprises: 1) during a period continuously monitoring (M_TMP) the temperatures measured by the plurality of flow meters over a period of time, 2) performing a data analysis (P_DA) on the temperatures of the plurality of flow meters from the period, 3) based on the data analysis, identifying (I_FDC) one or more ones of the plurality of flow meters as frost damage candidates in a future frost period, and 4) transmitting (T_WS) a warning signal indicative of the frost damage candidates or initiating frost protection measures to protect the frost damage candidates. It has been found that it is possible to monitor temperatures in a no-frost period to identify a frost damage candidate, e.g. if a flow meter is positioned in a pit and the lid is removed thereby causing the risk of a frost damage of the flow meter.

11 Claims, 3 Drawing Sheets

(58) Field of Classification Search
USPC .......................................................... 702/130
See application file for complete search history.

(56) References Cited

U.S. PATENT DOCUMENTS

| | | | | |
|---|---|---|---|---|
| 2021/0350295 | A1* | 11/2021 | Singh | G06Q 10/0635 |
| 2021/0381207 | A1* | 12/2021 | Brotherton | E03B 7/071 |
| 2022/0309907 | A1 | 9/2022 | Sabraoui et al. | |

FOREIGN PATENT DOCUMENTS

| | | | |
|---|---|---|---|
| KR | 20190083851 | A | 7/2019 |
| KR | 102116121 | B1 | 5/2020 |

* cited by examiner

PREVENTING FROST DAMAGE OF FLOW METERS IN A DISTRIBUTION NETWORK

This application is a Secondary and claims priority of European Patent Application No. 22203491.0, filed Oct. 25, 2022, which is hereby incorporated herein by reference in its entirety.

FIELD OF THE INVENTION

The present invention relates to the field of flow meters for measuring a consumed quantity of a fluid, e.g. water. More specifically, the invention relates to preventing frost damage of flow meters in a distribution network, such as flow meters placed in a pit or in a box above ground level.

BACKGROUND OF THE INVENTION

Prevention of and solving problems with freeze or frost in pipes and flow meters is well known. The international patent classification IPC has dedicated particular classes for this, namely E03B7/10 and E03B7/12. Prior art teaches many ways to remove the effects of freezing, such as electrically heating up a wire around the object to be protected, or to integrate escape rooms into which an expanding ice can grow without destroying the pipe or the meter. Other solutions include a shut-off valve which closes when the liquid temperature in the pipe approaches freezing temperatures, hereby protecting to some extent the pipes and meters placed after the valve. Even further, some solutions ensure a continuous flow of liquid through the pipe or the meter by opening a small drain valve with the only intention to enable a liquid flow in the pipe so that the liquid will not freeze.

Other known solutions described are solutions which counteract and undoes the effects of an actual or impending freeze situation. Instead of acting at the time of freezing one can send a warning signal immediately prior to a freezing happening.

One protection strategy to avoid freezing of the flow meter is to insulate the flow meter by wrapping it with insulating material. Another solution is to place the flow meter inside a protecting box; the protecting box is typically placed at or just above the ground surface. A further frequently used solution is a pit installation, where the flow meter is placed inside the pit which is buried in the ground. The flow meter will in such a solution typically be between 20 centimeters to 1 meter below the surface and covered with a lid. A man-hole solution. In some situations the lid does not protect well against the frost and owners or end users of the flow meters may even manually protect the meters by placing further protective sheets over the meters or pit lids in case of upcoming frost. This is of course cumbersome.

During normal and intended operation the frost protection measures described above are adequate and protective, but sometimes unintended situations occur. Thus, the insulation wrapping may be damaged leaving the flow meter exposed to frost. Or the protective box is damaged and a crack or hole allows a frost bite attack. In the pit solution often the lid is damaged, or even removed by humans or blown away by wind, hereby leaving open the flow meter to the full destructive impact of frost.

An example of a solution is described in KR10-2019-0083851, where a smart metering-based temperature sensor is able to measure a temperature inside a waterworks protection tank (protective container) through said temperature sensor connected to the waterworks remote checking system and to detect and prevent the meter from freezing and bursting. The temperature sensor detects the temperature inside the protective container; and a wireless communication terminal transmits information about flow measured by the digital meter and the information about temperature detected by the temperature sensor to a relay placed outside of the protective container. The temperature sensor and wireless communication terminal are mounted inside the protective container. However, in the solution described in KR10-2019-0083851 it may be seen as a problem that detection of a low temperature may not allow any action to prevent damage, e.g. in case a protection or insulation box around the meter is damaged, or in case a lid of a pit is broken or missing.

OBJECT OF THE INVENTION

It is an object of the present invention to solve the technical problem of flow meters placed outside of residential buildings, which in some geographical areas are exposed to frost with the risk that a pipe, a pipe connection or the flow meter housing is damaged.

The Applicant desires to improve the protection against frost damage to flow meters and especially to describe a solution to how to detect and warn if a flow meter is at risk of being damaged by frost. Especially, it is desired to describe a solution that allows sufficient time for actions to prevent frost damage.

SUMMARY OF THE INVENTION

In a first aspect, the invention provides a method for preventing frost damage to one or more flow meters installed in a fluid distribution network containing a fluid, wherein each flow meter is configured to measure a temperature, preferably an air temperature, and to wirelessly transmit the measured temperature, such as via a mobile or a fixed wireless reading system to a processing unit, characterized by the following steps:

- continuously monitoring over a period of time the temperatures measured by the plurality of flow meters, such as monitoring for each flow meter, a time series of temperatures measured at respective times during the period,
- performing a data analysis on the temperatures measured by the flow meters over the period of time,
- based on the data analysis, identifying one or more ones of the plurality of flow meters as frost damage candidates in a future frost period, and
- transmitting a warning signal indicative of the frost damage candidates or initiating frost protection measures to protect the frost damage candidates.

The steps can be performed by the processing unit. The invention has the advantage that the frost damage candidates of a group of flow meters, e.g. water meters, can be detected early and well in time before the actual frost bites. Especially, it has been observed that it is possible to monitor temperatures during a no-frost period, and still this allows identification of frost damage candidates. It has been found that continuous monitoring of temperatures will allow detection of abnormal thermal conditions of a flow meter and thus also the possible abnormal condition that may cause the flow meter to be more vulnerable to frost damage. In the most advantageous embodiment the no-frost temperatures are monitored and measured during summer, and already at this time, i.e. before any frost is threatening, a warning signal can be sent to the utility company that a flow meter in a specific pit or in a protection box is at particular risk of being damaged by frost in the upcoming winther which may be 4 or 5 months away.

This gives the utility company the advantage of having plenty of time to resolve the matter and save the flow meter—e.g. by replacing a removed cover of a pit or repairing a damaged box around the flow meter. This helps saving costs for the utility company and/or the end user.

Furthermore, the invention is advantageous, since it can be implemented by minor modifications of existing smart reading flow meters, e.g. building a temperature sensor into the housing of existing smart reading meters which can utilize existing wireless reading facilities to transmit temperature data. On the receiver side, the necessary software solutions on the receiver side to implement data analysis and the warning signal transmission or initiating frost protection activities can be implemented, which allow the utility company to benefit from flow meters which can be saved from frost damage.

Apart from saving costs to replacement of damaged flow meters, the invention will allow saving of valuable drinking water, since a frost damage of a flow meter will normally cause water leakage.

In the following, preferred embodiments or features will be described.

The temperatures are preferably measured by the plurality of flow meters over a period of time during a no-frost period, e.g. during summer. This allows identification of frost damage candidates in due time to allow initiating measure to protect the frost damage candidates—e.g. to replace a pit lid, or the like.

In some embodiments, the method comprises continuously monitoring minimum and maximum temperatures measured for at least a group of the plurality of flow meters, such as monitoring minimum and maximum temperatures per day for each of the plurality of flow meters over a period of time. Especially, the method may comprise identifying a frost damage candidate as a flow meter exhibiting minimum and maximum temperatures deviating from its normal individual pattern when measured over a period of time. Especially, the method may comprise identifying a frost damage candidate as a flow meter exhibiting minimum and maximum temperatures deviating from the minimum and maximum temperatures of a group of flow meters when measured over a period of time. Especially, the method may comprise determining for each of the plurality of flow meters an averaged minimum temperature and an averaged maximum temperature in response to minimum temperatures and maximum temperatures observed over a period of time, such as a period of 5-20 days, such as period of 5-15 days, such as a period of 8-12 days.

'Continuously monitoring' should be understood as meaning multiple samplings of data values with a regular of irregular time interval between each two samplings.

In some embodiments, the data analysis only involves determining deviations from a normal temperature pattern by analyzing measured temperatures separately for each individual flow meter.

In some embodiments, the data analysis only involves determining deviations from a normal temperature pattern by analyzing measured temperatures for a group of flow meters.

In some embodiments, the data analysis involves determining deviations from a normal temperature pattern by a combination of analyzing measured temperatures for a group of flow meters and analyzing measured temperatures separately for each individual flow meter.

In some embodiments, the method comprises monitoring a plurality of flow meters which are placed in geographical proximity of each other. By "proximity" may be understood as within 50-100 km 2 square kilometers, or within 1-50 $km^2$, or below 1 $km^2$. More specifically, the plurality of flow meters monitored may be positioned in the fluid distribution network in the same type of installation configuration, such as in a pit or in a box above ground level. By grouping the flow meters, especially after geographical proximity, it allows easier detecting of a deviating flow meter, since it can be assumed that all flow meters in the group are exposed to similar weather and thus temperature conditions.

In some embodiments, the temperature measured by each of the plurality of flow meters is an inside air temperature of the flow meter. Especially, the temperature may be measured by a temperature sensor arranged inside a housing of the flow meter, more specifically such sensor may be a temperature sensor arranged inside a cavity of the housing where at least a part of a flow measurement circuit of the flow meter is arranged. It may be preferred that the temperature sensor is placed on a printed circuit board along with electronic components related to the flow meter function.

In some embodiments, a frost damage candidate is identified as a flow meter having a measured time series of temperatures which is dissimilar to corresponding time series of temperatures measured by a group of other ones of the plurality of flow meters according to the data analysis. More specifically, a frost damage candidate may be identified as a flow meter exhibiting temperature data outliers with respect to measured time series of temperatures during the period observed, e.g. a no-frost period.

In some embodiments, the data analysis may comprise statistical methods to calculate a value for each flow meter based on the measured time series of temperatures during the period observed, e.g. a no-frost period, and wherein a frost damage candidate is identified as a flow meter exhibiting a statistical value which differs by more than a preset threshold from the group of other ones of the flow meters. Especially, the data analysis may comprise calculating a mean or median of the temperature for a period of time, such as per day, measured during the period for a group of the plurality of flow meters, and wherein a distance measure is calculated, such as a Euclidian distance measure, between said mean or median for the group of flow meters and the measured temperature in the same period of time for each of the flow meters, so a to identify a frost damage candidate.

In some embodiments, the step of identifying a frost damage candidate may involve taking into account a measured fluid flow for each of the plurality of flow meters in the period, such as discarding temperature measurements for a flow meter if measured at a time where the flow meter has measured a fluid flow outside a predetermined interval. Specifically, the data analysis may comprise identifying one or more of the plurality of flow meters as frost damage candidates only if the one or more flow meters exhibits a statistical value differing by more than a preset threshold from the group of other ones of the flow meters over a period of time, such as over a plurality of days. In this way accidental differences for a short period of time for a flow meter are ignored, and only a more constant difference over a predetermined period of time is taken as a sign of an abnormal conditions indicating that the flow meter is a frost damage candidate.

In some embodiments, the data analysis may comprise calculating a correlation coefficient of temperatures measured by each of the plurality of flow meters in relation to temperatures measured in the same time period by other ones of the plurality of flow meters. In this way a measure of deviation can be determined based on a mathematical algorithm and a simple value or threshold can be setup for identifying a frost damage candidate. Especially, the method may involve temperatures measured in the same time period by all other ones of the plurality of flow meters being located in the same geographical area. Especially, a frost damage candidate is identified as a flow meter which essentially is not correlated with the temperature movements of the other flow meters, e.g. having a measured one or more temperatures during, e.g. the no-frost period, which result in a correlation coefficient which is numerically below a preset threshold value, such as a preset threshold value being numerically below 0.5, such as being numerically within 0.1-0.5, such as a preset threshold value being numerically below 0.25.

The data analysis may comprise calculating at least one metric selected from the group of: minimum temperature, maximum temperature, Mean Square Error, Mean Absolute Percentage Error, and Dynamic Time Warping.

The flow meters may especially be water meters.

An improved detection of a frost damage candidate is obtained by including the strength of the radio signal in the analysis. The radio signal from the flow meter has to pass through the lid of the pit or through the walls of the box and will be attenuated during this passing. The processing unit monitors the signal strength over time and if it suddenly is increased this is an indication that the lid has been removed or the box has an opening. It is thus advantageous to detect and monitor the signal strength of the radio signal by the processing unit and to use the signal strength as a further parameter in the data analysis of the temperatures measured.

In a second aspect, the invention provides a system for monitoring a fluid distribution network which comprises pipes and a plurality of flow meters, said flow meters being placed at respective positions in the fluid distribution network, such as placed in a pit or inside a box, wherein each of the flow meters are configured for measuring a temperature, such as an air temperature, and further being configured for wirelessly transmitting the measured temperature to a processing unit, such as via a mobile or fixed wireless reading system to the processing unit, characterized in

- that the processing unit, such as a local computer or a central server, can access a temperature database holding temperatures measured by the plurality of flow meters during a period, such as time series of temperatures for each of the flow meters over a period comprising a no-frost period,
- that the processing unit has a data analysis unit which is configured to analyse the temperatures measured by the plurality of flow meters from the period,
- that the processing unit has an identification unit which, based on a result from the data analysis unit, is configured to identify one or more of the flow meters as frost damage candidates in a future frost period, and
- that the processing unit generates a warning signal indicative of the identified frost damage candidates or initiates frost protection measures to protect the frost damage candidates.

Especially, the warning signal is preferably generated in the no-frost period. Hereby, the utility company then has ample time (during Summer) to correct the fault detected, e.g. replacing a removed lid.

Especially, the flow meters may be arranged to transmit their respective positions, such as GPS positions, to the processing unit, and that the processing unit is arranged to group the flow meters into groups with neighbouring flow meters in response to their positions, and wherein the data analysis unit is arranged to perform the data analysis based on said groups of neighbouring flow meters. This has the advantage that the frost warning can be made more precise, because flow meters placed at a high altitude can be grouped together and not mixed with flow meters at at lower altitude. In this way flow meters having the same ambient conditions can be compared, thus allowing a more sensitive way of identifying a deviating flow meter.

The flow meters may be ultrasonic flow meters and the temperature measured is a temperature of the fluid calculated from transit-time measurements made by ultrasonic piezo transducers. Thus, the temperature measurement is actually an indirect temperature measurement. Hereby, the ultrasonic transducers of the flow meters can be utilized both for flow measurements as well as for temperature measurements to be part of the frost candidate identification.

The flow meters may be arranged to measure both an air temperature and a fluid temperature, such as measuring air temperature and fluid temperature simultaneously or nearly simultaneously. Especially, if fluid temperature is measured during no-flow and/or during flow conditions, it can be possible not only to identify single flow meter frost damage candidates, but distribution pipe frost candidates can be identified as well.

In some embodiments, the flow meters are ultrasonic flow meters and wherein the temperature measured is an internal flow meter temperature measured by a temperature sensor placed inside a housing of the flow meter. Especially, the temperature sensor may be placed on a printed circuit board inside the housing of the flow meter. It may be preferred to measure ambient air temperatures rather than fluid temperatures, since fluid temperature may be complicated due to the fluid sometimes being in no-flow conditions, while at other times there is flow, and sometimes, the flow meter may not even filled with fluid.

Preferably, the flow meters are arranged to transmit the measured temperature represented as data in wireless data packets along with data representing a measured fluid flow quantity.

The temperature database of the server may further include meteorological temperature data provided by a third party meteorological weather data provider, and wherein the data analysis unit is arranged to analyse the temperatures of the plurality of flow meters from the no-frost period along with the meteorological temperature data. Such meteorological weather data may be utilized in the data analysis to facilitate the identification of a frost damage candidate. The meteorological data will typically be fetched via an internet access to the data providers.

The fluid distribution network may especially be a water distribution network, and the flow meters may be water meters for measuring a consumed amount of water.

In a third aspect, the invention provides use of the method according to the first aspect for preventing frost damage on flow meters, such as water meters in a water distribution network.

Features and embodiments of the first, second and third aspects of the present invention may each be combined with each other. These and other aspects of the invention will be apparent from and elucidated with reference to the embodiments described hereinafter.

BRIEF DESCRIPTION OF THE FIGURES

The present invention and in particular preferred embodiments thereof will now be disclosed in more detail with regard to the accompanying figures. The FIGS. show ways of implementing the present invention and are not to be construed as being limiting to other possible embodiments falling within the scope of the attached claim set.

DETAILED DESCRIPTION OF EMBODIMENTS

Figure 1A:
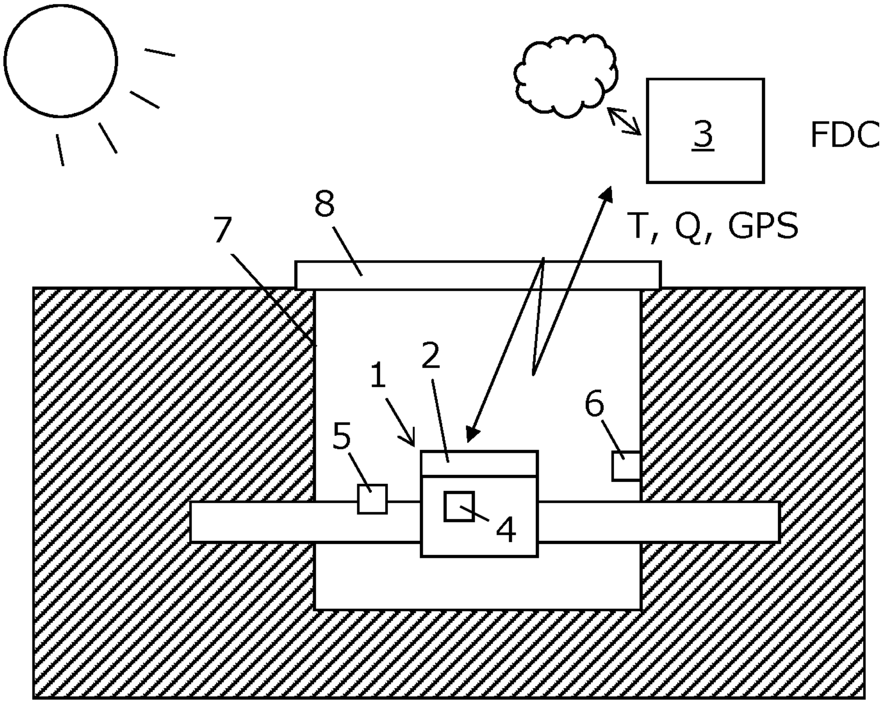
FIG. 1*a* shows a flow meter placed in a pit.
Figure 1B:
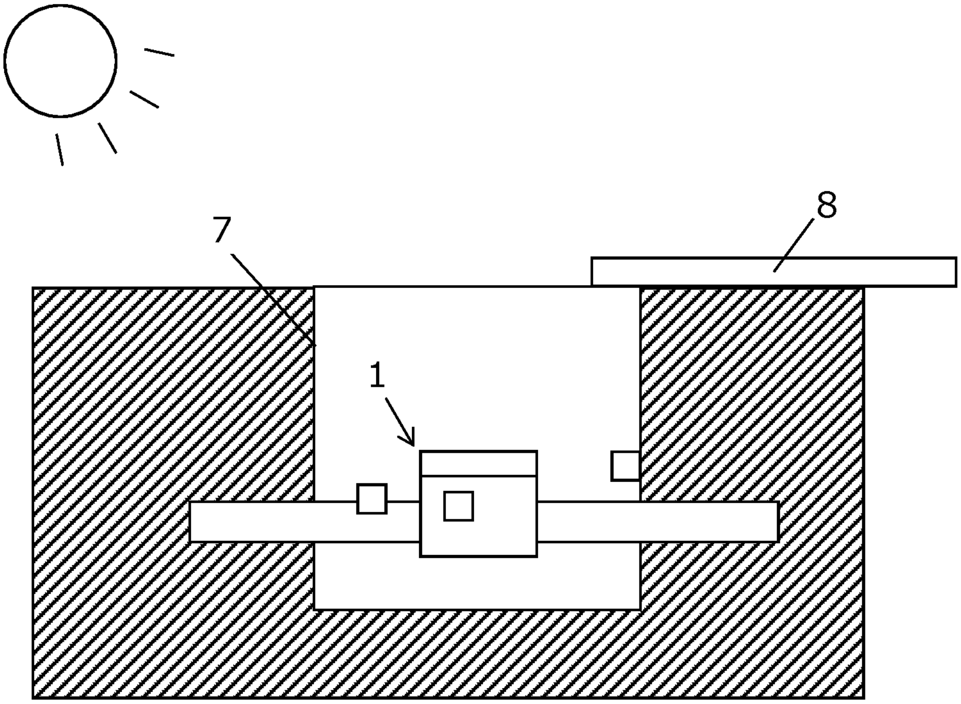
FIG. 1*b* shows a flow meter placed in a pit with a cover removed.

FIGS. 1*a* and 1*b* show a flow meter 1 placed in a pit 7 in two different situations. In FIG. 1*a*, the flow meter 1 is placed in a pit 7 with a cover 8 serving to protect the pit 7 against dirt, rain, sun rays and frost, while in FIG. 1*b* the cover 8 is for some reason removed, and thus the pit 7 and thereby also the flow meter 1 is more directly exposed to dirt, rain, sun rays and frost. According to preferred embodiments of the invention, an air temperature is monitored in the pit, e.g. inside the flow meter 1, in a no-frost period, so as to determine if the cover 8 is fully or partly removed from the pit 7, and thereby exposing the flow meter 1 to frost in case of low temperature, i.e. thereby causing such flow meter 1 to be a frost damage candidate in a frost period. According to the invention, such frost damage candidate flow meter 1 can be identified already in a no-frost period, thus allowing early alarming and taking actions to e.g. replace the cover 8 in case it is misplaced or removed from the pit 7 before a period of frost, thereby preventing any damage of the frost damage candidate flow meter.

Preferably, the a frost damage candidate flow meter is identified by monitoring temperatures for a group of neighbouring flow meters 1 and performing data analysis on time series of such measured temperatures. The data analysis may involve various mathematical methods of identifying one or more flow meters 1 which exhibit temperatures considered as outliers from the group median or average, thereby indicating that such flow meters 1 could be a potential frost damage candidate, since the deviating temperature profile could be caused by the fact that the cover 8 is removed from the pit 7.

In order to obtain a robust condition monitoring without too many false positives the temperature data in a no-frost period from a group of a plurality of flow meters are monitored and a data analysis is preformed to determine any one or the flow meters which exhibit temperatures which can be considered as outliers or uncorrelated to the temperature profile for the group. The grouped of flow meters preferably comprises flow meters that can be considered as located under the same conditions, preferably located in the same geographical area, such as within an area of 1 $km^2$. Thus in a large network of flow meters covering a large geographical area, the flow meters are preferably grouped into a number of neighbouring groups.

The flow meter 1 is preferably a digital smart meter with a radio transmitter 2 enabled for wireless communication with a server 3 by means of a dedicated reading network such as a LoRA based network, wireless M-Bus and/or via Nb-IoT or 4G or 5G mobile network communication or the like. The flow meter 1 may further or alternatively be configured for wireless communication with a mobile receiver by drive by using a mobile receiver. A radio transmitter 2 transmits RF signals with information about temperature T, flow Q and/or global positioning GPS in the shown example via the cloud to a remote server 3.

The temperature sensor is preferably arranged inside the ultrasonic flow meter 1, i.e. it is preferably an internal temperature T sensor 4 placed inside a housing of the flow meter 1, e.g. placed on a printed circuit board. The flow meter further comprises two ultrasonic sensors used for measuring the transit time of flight between the two sensors. From the transit time the fluid flow rate Q through the pipe can be determined. In some embodiments, the ultrasonic sensors are also used to determine the temperature of the fluid, since the transit time is a function of the fluid temperature. This may additionally or alternatively be used as a measure of temperature to be transmitted for identifying frost damage candidates.

The most preferred solution is to use the sensor 4, i.e. a separate temperature sensor 4, which is mounted inside a housing of the flow meter 1, e.g. on the printed circuit board on which electronic components of the flow meter are arranged, already when manufacturing the flow meter. Such temperature sensor 4 inside the flow meter housing will be protected from physical damage, and it can be connected directly to the electronic components inside the flow meter 1, such as the radio transmitter 2, and it can be built into the flow meter 1 easily in an existing process of manufacturing the flow meter 1. Especially, it may be preferred to transmit temperature data along with existing data packets for transmitting a measured liquid flow quantity Q and e.g. also GPS data.

The temperature T to be transmitted for frost damage candidate analysis can alternatively or additionally be the fluid temperature determined by a sensor 5 mounted on the fluid pipe and extending through the fluid pipe into the liquid or by a sensor 6 mounted on a wall of the pit 7.

According to the invention a number of temperatures representing the temperatures in the pit 7 are transmitted to the server 3 or another receiver. The temperatures are measured during a time period of no-frost, such as during 1, 2 or 3 months in Summer. The temperatures will have the same daily or weekly patterns and trends and no disruptive changes in the temperatures are to be expected.

In the situation shown in FIG. 1*b*, the cover 8 has been displaced from its original and intended position, thus leaving the pit 7 partly or fully unprotected. This can happen if a service technician forgets to put the cover 8 back in place after servicing the pit 7. In the situation of FIG. 1*b* the temperature measured during day time will increase markedly compared to the situation with the cover 8 in place, because the sun rays now warm up the flow meter 1 directly, since there is no protection from the cover 8. The rise in temperature will be readily detectable by the server 3 by suitable data analysis taking into account preferably time series of temperatures from other similar flow meters placed in pits in the neighbourhood, and thus basically under the same weather conditions. It has been found possible to detect a flow meter in a pit 7 with the cover 8 removed as an outlier when comparing statistical parameters, e.g. based on calculating a distance measure between time series for temperatures measured by each flow meter in a group of neighbouring flow meters.

A flow meter 1 detected as an outlier in such data analysis can be considered as a frost damage candidate, since the removed cover 8 will cause the flow meter 1 to be exposed to frost in the pit 7 compared to the situation in FIG. 1*a* with the cover 8 in place. Hence, the server 3 could act and signal a warning indicating the identified frost damage candidate flow meter, and since this is done already in the no frost period, there is sufficient time for service personnel to visit the frost damage candidate flow meter and to place the cover 8 in its original position before the frost period sets in and thus before there is an actual risk of frost damage of the flow meter 1.

Figure 2:
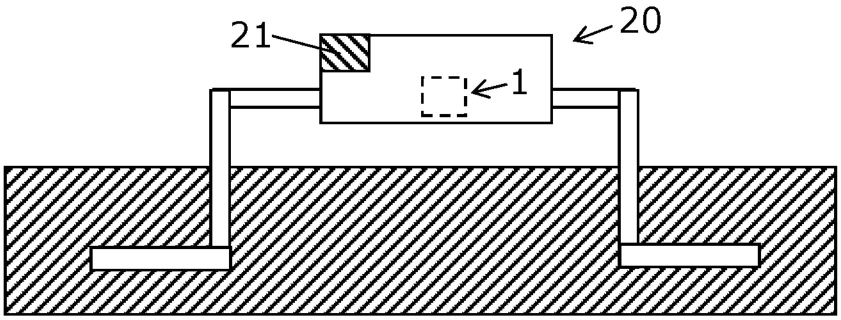
FIG. 2 shows a flow meter inside an above-ground sensor box.

FIG. 2 shows an alternative position of the flow meter, namely inside an above-ground sensor box. Inside the box a flow meter of the same kind as in FIG. 1*a* or 1*b* is placed, thus protected by the box. Inside the box, the flow meter is protected against mechanical attacks, against rain, sun and frost. However, in FIG. 2 it can be seen that a corner 21 of the box has been damaged, and thus an undesired opening into the flow meter 1 exists. Through this opening frost could potentially cause the flow meter to freeze, i.e. the flow meter inside such damaged box is a potential frost damage candidate which could be identified by means of the present invention in the manner similar to that described above for the pit position shown in FIGS. 1*a* and 1*b*.

Figure 3:
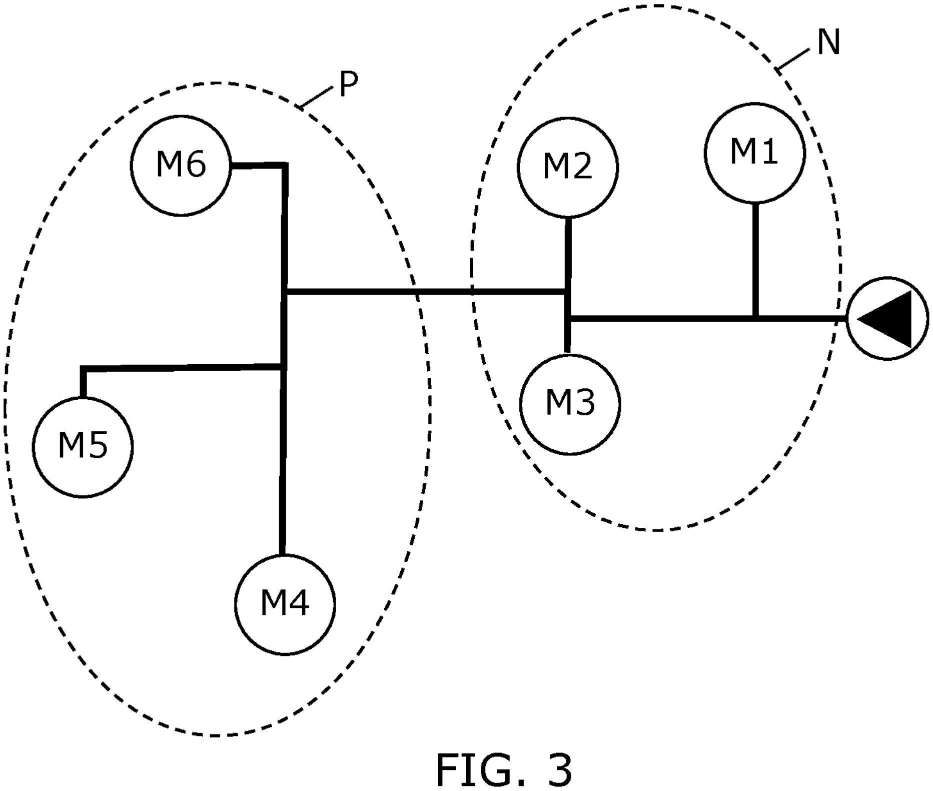
FIG. 3 shows a plurality of flow meters as part of a fluid distribution network.

FIG. 3 shows a plurality of flow meters M1 to M6 as part of a fluid distribution network. The fluid distribution network is supplied with water from a water utility company. From the main pipes service pipes are branched off, and in the service pipes, flow meters M1-M6 are installed to measure fluid flow quantities. E.g. these meters M1-M6 can be placed in pits as shown in FIG. 1*a* or 1*b*, or inside a box above ground level as shown in FIG. 2.

Each of the flow meters M1-M6 transmit temperature information to a receiver in the form of a computer or central server via a radio frequency communication network, such as LoRaWAN® or via a cellular network using e.g. Nb-IOT.

In order to get an even more reliable statement about being a frost damage candidate or not, the strength of the radio signal sent from the flow meter is included in the data analysis by the processing unit 3. The inclusion of the signal strength is relevant for those flow meters that have an RF antenna built into the flow meter or have the antenna placed in the pit or inside a box. Turning to FIG. 1*a* the radio signal will in the situation with the lid 8 correctly in place be dampened. The amount of dampening of the signal when passing through the lid is dependent on the material of the lid, say metal, plastic or wood, but in any case a removal of the lid as shown in FIG. 1*b* will result in a significant and detectable increase in signal strength. The processing unit 3 monitors over time—together with the monitoring of the temperatures measured by the flow meter—the development in the signal strength and an abrupt increase in the signal strength is an indication of a removed lid. Also a broken lid with cracks caused e.g. by the passage of cars over the lid may be detected. The same considerations applies to the situation of FIG. 2 where the damaged corner 21 enables the increase in the strength of signal sent from flow meter 1.

A very robust frost damage candidate detection is achieved if the parameters internal temperature of the flow meter, fluid temperature and RF signal strength of the flow meter are included in the data analysis (P_DA) performed by the processing unit 3.

In preferred embodiments of the invention, flow meters M1-M6 are grouped based on their geographical location, e.g. based on their GPS coordinates transmitted to the computer or central server. Hereby it is ensured, that the expected temperature variation due to geographical and local weather conditions is similar or at least comparable. This facilitates the finding of a potential frost candidate as an outlier in the group by suitable data analysis on measured time series of temperatures for all meters in a group.

In FIG. 3 flow meters M1, M2 and M3 are grouped into one group N, and flow meters M4, M5 and M6 are grouped into another group P. These groupings P, N could be made e.g. because group P members are placed at a higher altitude above sea level than the meters in group N, i.e. groups N and P are geographically different and thus temperatures measured by a meter M1 in one group N can be expected to differ from temperatures measured by a meter M4 in the other group P.

Taking into account such groupings of meters based on geographical location of the meters has been found to allow a more robust and trustworthy frost damage candidate identification, and thus a more trustworthy alarm can be given because meters operating under the same environmental conditions are correlated with each other. Preferably, their GPS locations could be used for grouping, or in case the distribution network has a mix of flow meters in different installation configurations (e.g. pit and above-ground box installed meters), the grouping could be make according to the installation configuration rather than geographical location.

In the following, more detail about a possible specific data analysis and identification of a frost damage candidate is given based on appropriate groups of meters, where it can be expected that the measured temperature of most meters in the group to be similar. This is preferably obtained by grouping the meters based on their geographical position, e.g. determined by their GPS coordinates. Additionally or alternatively, the grouping can be based on the type of installation configuration for the flow meters, e.g. placed in a pit or placed inside a box above ground level.

Thus, suitably grouped so that the flow meter in a group can be considered as similar with respect to geographical position, i.e. equally exposed to same weather conditions etc., and all flow meters being installed in the same type of installation configuration, e.g. all placed in a pit or all placed in a box above ground level, then the measured temperatures of most flow meters can be expected to be similar, also seen over time.

If however one or more flow meters are exposed to different conditions, e.g. placed in a pit with the cover removed, or placed in a box above ground level which is damaged, then it has been found possible to detect a temperature difference between such flow meter and the remaining flow meters of the group by applying a suitable data analysis, and such deviating flow meter is then considered as a frost damage candidate, since it can be expected that its data deviates due to the deviating condition which also means that the flow meter will be vulnerable in a frosty period.

Therefore, the problem of finding a frost damage candidate among the flow meters of a group it to identify a flow meter exhibiting temperatures which can be considered as an outlier when compared to the flow meters of the group. In short, such outlier problem can be identified as to find a flow meter with a temperature time series that is the most dissimilar from the other flow meters in the group. Such problem can be solved by calculating a statistical measure (i.e. a parameter) for each flow meter compared to the group of flow meters, and then, based on the statistical measure, it can be determined if one or more flow meters stand out or deviates significantly from the group. Such statistical measure can be calculated in many ways.

In the table below, an example of sample data for 10 meters (0-9) grouped in two groups (N and P) with monitored temperatures (° C) over seven days. The temperature per day can be a temperature calculated as an average of temperatures measured at a plurality of different times during the day.

TABLE 1

| group | meter_id | Day 1 | Day 2 | Day 3 | Day 4 | Day 5 | Day 6 | Day 7 |
|---|---|---|---|---|---|---|---|---|
| N | 0 | 14.61 | 14.38 | 15.6 | 14.96 | 12.2 | 16.34 | 17.57 |
| N | 1 | 14.54 | 14.74 | 15.43 | 14.06 | 12.17 | 16.76 | 17.68 |
| N | 2 | 14.7 | 14.11 | 15.05 | 14.93 | 12.42 | 16.03 | 17.22 |
| N | 3 | 14.49 | 14.32 | 15.1 | 14.83 | 17.13 | 21.2 | 22.17 |
| N | 4 | 14.89 | 14.74 | 15.78 | 14.07 | 12.13 | 16.16 | 17.31 |
| P | 5 | 14.13 | 14.16 | 15.04 | 14.35 | 12.11 | 16.16 | 17.76 |
| P | 6 | 14.23 | 14.46 | 15.69 | 14.69 | 12.85 | 16.85 | 17.41 |
| P | 7 | 14.32 | 14.9 | 15.07 | 14.81 | 12.77 | 16.9 | 17.72 |
| P | 8 | 14.76 | 14.83 | 15.74 | 14.64 | 12.45 | 16.81 | 17.45 |
| P | 9 | 14.35 | 14.4 | 15.55 | 14.99 | 12.06 | 16.05 | 17.06 |

As seen from Table 1, the flow meter with id 3 has a significant higher temperature over the last three days (Day 5, Day 6 and Day 7) than the rest of its group. One example of a method for finding the most dissimilar temperature series would be to create a summary series per group—this could be a mean or a median of the temperature per day. Using the median as an example:

$$t\_i=\text{Median}(X_i) \quad (1)$$

where i is any day in the dataset, and X is the temperatures of the flow meters for that day. This produces a summary series for each group, and this series can then be used in similarity metrics to compare a flow meter series of the group to the summary series.

There are many possible metrics that can be used for the comparison—such as calculating the Euclidian distance of the flow meter's series to the summary series:

$$d=\sqrt{(x\cdot t\_i)} \quad (2)$$

where x is a flow meter series and t_i is the summary series per group.

Other possible metrics include: MSE (mean square error), MAPE (mean absolute percentage error), or dynamic time warping.

The data analysis may preferably also comprise determining a measure of variance in the series. However, for simplicity this is excluded in the present description.

The data analysis may preferably also comprise taking into account a liquid flow quantity measure by each flow meter. However, for simplicity this is also excluded in the present description.

If calculating for each flow meter a distance measure N_d calculated as:

$$N\_d=\sqrt{\Sigma(T\_m-T\_s)^2} \quad (3)$$

where T_m is the temperature values for the time series of the seven temperatures for the flow meter, while T_s it the average temperature values for the time series of the seven temperatures for the remaining flow meters in the group.

With the distance calculated as N_d described above, Table 2 shows the resulting distances for the temperature measurement values in Table 1.

TABLE 2

| Group | meter_id | N_d |
|---|---|---|
| N | 0 | 0.21 |
| N | 1 | 0.96 |
| N | 2 | 0.71 |
| N | 3 | 8.32 |
| N | 4 | 1.01 |
| P | 5 | 1.07 |
| P | 6 | 0.44 |
| P | 7 | 0.79 |
| P | 8 | 0.61 |
| P | 9 | 0.99 |

From Table 2, it can be seen that the flow meter with id of 3 has a significant larger distance N_d to the summary series than the other meters in its group (N). Consequently, the flow meter with id 3 can be identified as a frost damage candidate.

The other group (P) does not show any significant distances for any of the meters (5-9), and thus none of these flow meters (5-9) is identified as a frost damage candidate.

In the above example, frost damage candidate flow meters are identified by determining temperature deviations in each single flow meter with respect to a time series of temperatures measured in a group of flow meters. However, in a simpler data analysis version, the daily minimum and maximum temperatures for each individual flow meter is monitored over a period of time, e.g. 10 days, and if one flow meter exhibits a pattern over time deviating from its normal behaviour, the flow meter may be identified as a frost damage candidate, since this could indicate an abnormal condition of the flow meter. Especially, an abnormal behaviour may be observed, and if the same abnormal behaviour continues over several days, the flow meter may be identified as a frost damage candidate. Hereby, with such delay in identifying a frost damage candidate, the risk of false identified frost damage candidates can be reduced.

Figure 4:
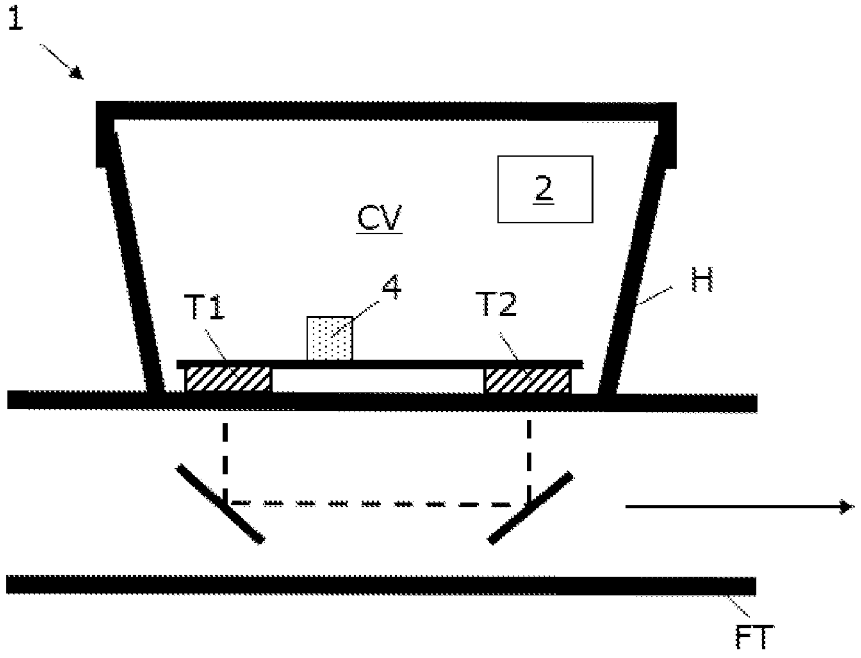
FIG. 4 shows an embodiment of ultrasonic flow meter according to the present invention.

FIG. 4 illustrates a specific ultrasonic flow meter 1 configured for the present invention. Namely, a flow meter 1 with a housing H and flow tube FT for mounting on a pipe of a fluid distribution network for measuring a fluid flow quantity by ultrasonic piezo transducers T1, T2 arranged inside a cavity CV formed by the hosing H and being configured for transmitting ultrasonic waves through the wall of the flow tube FT and for transmitting ultrasonic waves (dashed lines) along the fluid flow direction (arrow) via reflectors inside the flow tube FT. In this way a fluid flow quantity can be calculated by transit-time measurements made by ultrasonic piezo transducers T1, T2, and this quantity can be transmitted in a wireless radio frequency signal by transmitter 2 placed inside the cavity CV of the housing H.

Further, a temperature sensor 4 for measuring the air temperature inside the cavity CV of the housing H is seen, here illustrated as mounted on a printed circuit box which allows easy manufacturing and facilitates electric connection to a measurement circuit which may be also mounted on the same printed circuit board. The temperatures measured by the temperature sensor 4 are also transmitted via the radio transmitter 2, and these transmitted temperatures can then be used for data analysis for frost damage candidate identification according tot the invention.

Figure 5:
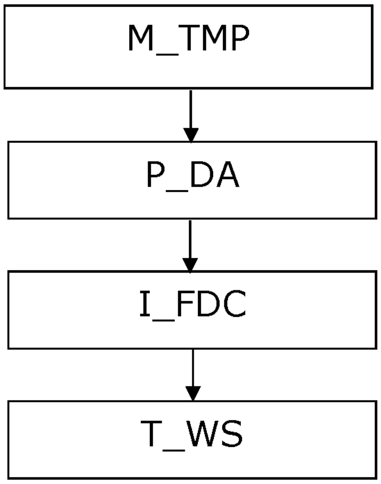
FIG. 5 shows a flow chart illustrating a method according to the present invention.

FIG. 5 illustrates steps of a method embodiment, where each of a plurality of flow meters are configured to measure air temperature, and to wirelessly transmit the measured temperature to a processing unit. The method comprises during a no-frost period monitoring M_TMP the temperatures measured by the plurality of flow meters over a period of time, such as monitoring for each flow meters, a time series of temperatures measured at respective times during the no-frost period. Then, performing a data analysis P_DA on the temperatures, preferably temperature series, of the plurality of flow meters from the no-frost period. Further, based on the data analysis, identifying I_FDC one or more ones of the plurality of flow meters as frost damage candidates in a future frost period, and finally transmitting T_WS a warning signal indicative of the frost damage candidates, which in turn allows service personnel to initiate frost protection measures to protect the frost damage candidates.

Instead of or additionally to the warning signal a signal can be send to auxiliary equipment such as a valve built into the flow meter or placed in the pipe up stream or down stream of the flow meter, and then actuate such valve to close or open the fluid flow in order to prevent or mitigate frost damage.

Although the present invention has been described in connection with the specified embodiments, it should not be construed as being in any way limited to the presented examples. The scope of the present invention is set out by the accompanying claim set. In the context of the claims, the terms “comprising” or “comprises” do not exclude other possible elements or steps. Also, the mentioning of references such as “a” or “an” etc. should not be construed as excluding a plurality. The use of reference signs in the claims with respect to elements indicated in the figures shall also not be construed as limiting the scope of the invention. Furthermore, individual features mentioned in different claims, may possibly be advantageously combined, and the mentioning of these features in different claims does not exclude that a combination of features is not possible and advantageous.

The invention claimed is:

1. A method for preventing frost damage to a plurality of flow meters installed in a fluid distribution network containing a fluid, wherein each flow meter is configured to measure a temperature, and to wirelessly transmit via radio signals the measured temperature to a processing unit, the method comprising:

- continuously monitoring over a period of time the temperatures measured by the plurality of flow meters,
- performing a data analysis on the temperatures measured by the flow meters over the period of time,
- based on the data analysis, identifying one or more enes-of the plurality of flow meters as frost damage candidates in a future frost period, and
- transmitting a warning signal indicative of the frost damage candidates or initiating frost protection measures to protect the frost damage candidates,
- wherein a frost damage candidate is identified as a flow meter having a measured time series of temperatures which is dissimilar to corresponding time series of temperatures measured by a group of other ones of the plurality of flow meters according to the data analysis.

2. The method according to claim 1, comprising monitoring the temperatures measured by the plurality of flow meters over a period of time during a no-frost period.

3. The method according to claim 1, comprising continuously monitoring minimum and maximum temperatures measured for at least a group of the plurality of flow meters over a period of time, and identifying a frost damage candidate as having one of the following measured temperature characteristics: 1) exhibiting minimum and maximum temperatures deviating from its normal individual pattern when measured over a period of time, 2) exhibiting minimum and maximum temperatures deviating from a group of flow meters when measured over a period of time, or 3) exhibiting minimum and maximum temperatures deviating by more than a predetermined amount from a group of flow meters when measured over a period of time.

4. The method according to claim 3, comprising determining for each of the plurality of flow meters an average minimum temperature and an average maximum temperature in response to minimum temperatures and maximum temperatures observed over a period of time.

5. The method according to claim 1, wherein the plurality of flow meters monitored are placed in geographical proximity of each other and positioned in the fluid distribution network in the same type of installation configuration.

6. The method according to claim 1, wherein the temperature measured by each of the plurality of flow meters is an inside air temperature of the flow meter where at least a part of a flow measurement circuit of the flow meter is arranged.

7. The method according to claim 1, comprising calculating a statistical value for each flow meter based on the measured time series of temperatures during a no-frost period, and wherein a frost damage candidate is identified as a flow meter exhibiting a statistical value which differs by more than a preset threshold from the group of other ones of the plurality of flow meters.

8. The method according to claim 1, wherein the step of identifying a frost damage candidate involves taking into account a measured fluid flow for each of the plurality of flow meters in the period of time of monitoring.

9. The method according to claim 7, comprising identifying one or more of the plurality of flow meters as frost damage candidates only if the one or more of the plurality of flow meters exhibits a statistical value differing by more than a preset threshold from the group of other ones of the plurality of flow meters over a period of time.

10. A method for preventing frost damage to a plurality of flow meters installed in a fluid distribution network containing a fluid, wherein each flow meter is configured to measure a temperature, and to wirelessly transmit via radio signals the measured temperature to a processing unit, the method comprising:

- continuously monitoring over a period of time the temperatures measured by the plurality of flow meters,
- performing a data analysis on the temperatures measured by the flow meters over the period of time,
- based on the data analysis, identifying one or more of the plurality of flow meters as frost damage candidates in a future frost period, and
  - transmitting a warning signal indicative of the frost damage candidates or initiating frost protection measures to protect the frost damage candidates,
- wherein the data analysis comprises calculating a correlation coefficient of temperatures measured by each of the plurality of flow meters in relation to temperatures measured in the same time period by other ones of the plurality of flow meters, and identifying a frost damage candidate as a flow meter having a measured one or more temperatures during a no-frost period or another period of time which result in a correlation coefficient which is numerically below a preset threshold value.

11. A method for preventing frost damage to a plurality of flow meters installed in a fluid distribution network containing a fluid, wherein each flow meter is configured to measure a temperature, and to wirelessly transmit via radio signals the measured temperature to a processing unit, the method comprising:

continuously monitoring over a period of time the temperatures measured by the plurality of flow meters, performing a data analysis on the temperatures measured by the flow meters over the period of time, based on the data analysis, identifying one or more of the plurality of flow meters as frost damage candidates in a future frost period, and transmitting a warning signal indicative of the frost damage candidates or initiating frost protection measures to protect the frost damage candidates, wherein a signal strength of a radio signal is detected by the processing unit, and wherein the signal strength is used as a further parameter in the data analysis on the temperatures measured.

* * * * *